United States Patent [19]

Lester et al.

[11] Patent Number: 4,832,935

[45] Date of Patent: May 23, 1989

[54] METHOD FOR DEHYDRATING HYDROGEN FLUORIDE

[75] Inventors: Joseph E. Lester, Lincoln; Robert C. Folweiler, Bedford, both of Mass.

[73] Assignee: GTE Laboratories Incorporated, Waltham, Mass.

[21] Appl. No.: 116,928

[22] Filed: Nov. 4, 1987

[51] Int. Cl.[4] .......................... C01B 7/19; C01B 7/08; C01G 23/047; C01G 25/02; C01G 27/02
[52] U.S. Cl. .................................. 423/483; 423/488; 423/612; 423/608
[58] Field of Search ............... 423/483, 488, 481, 608, 423/611, 612, 484; 210/689; 260/545 R

[56] References Cited

U.S. PATENT DOCUMENTS

| | | | |
|---|---|---|---|
| 2,388,156 | 10/1945 | Kelley | 423/484 |
| 2,507,605 | 5/1950 | Lopker et al. | 423/483 |
| 4,652,438 | 11/1985 | Folweiler | 423/489 |

FOREIGN PATENT DOCUMENTS

| | | | |
|---|---|---|---|
| 420105 | 6/1932 | United Kingdom | 423/612 |
| 648706 | 11/1947 | United Kingdom | 423/488 |
| 881532 | 11/1961 | United Kingdom | 423/483 |
| 1332968 | 10/1973 | United Kingdom | 423/483 |

OTHER PUBLICATIONS

Kirk-Othmer, "Encyclopedia of Chemical Technology", vol. 12, 3rd ed., p. 76.

*Primary Examiner*—Robert L. Stoll
*Assistant Examiner*—Adriana L. Eng
*Attorney, Agent, or Firm*—Ivan L. Ericson

[57] ABSTRACT

A method for controlling the water present in hydrogen fluoride is described which effectively removes all the water contained in the hydrogen fluoride solution to form other compounds that either have extremely low vapor pressure or are acceptable in a process such as chemical vapor purification. The method involves as one of the steps the contacting of a reactive metal halide with a hydrogen fluoride containing water. The metal halide reacts with the water contained in the hydrogen fluoride solution yielding a metal oxide, hydrogen halide, and anhydrous hydrogen fluoride. The metal oxide is a solid, with low vapor pressure, thereby effectively removing oxygen-bearing species from the hydrogen fluoride.

5 Claims, No Drawings

METHOD FOR DEHYDRATING HYDROGEN FLUORIDE

The Goverment has rights in this invention pursuant to Contract No. N00014-86-C-2174 awarded by the U.S. Navy.

FIELD OF THE INVENTION

This invention relates to a method for dehydrating hydrogen fluoride. More particularly, this invention relates to the method of dehydrating hydrogen fluoride with a reactive metal halide.

BACKGROUND OF THE INVENTION

In the preparation of high purity zirconium fluoride by the process known as chemical vapor purification (CVP), the presence of zirconium-oxygen bonds have been observed in the product of the process. It appears that the oxygen is substituting for F in the crystal structure of the $ZrF_4$ sample, thus carrying undesirable oxygen-bearing species into the materials prepared using the $ZrF_4$.

The potential sources of the oxygen are very limited, but for completeness, could include the chlorine, the argon, the reactor, and/or the hydrogen fluoride used in the CVP process.

The argon used in the process has been treated by passing it over titanium metal heated to 700° C., a technique well known to remove oxygen to partial pressures $10^{-20}$ atmospheres [Data Sheet on Model 2A-100SS Gettering Furnace with Oxygen Monitor, Centorr Associates (1979)]. Similarly, the chlorine, also known to contain water, has been passed over the surface of the reactive metal used to prepare the fluoride, such as zirconium, in the process of generating the desired chloride vapor. The metal reacts with any oxygen present in the incoming stream to form the solid, low vapor pressure oxide or oxychloride; if the oxygen bearing species is water vapor, the hydrogen will be released. Because of the high thermodynamic driving force for the oxide to form under the conditions used, the oxygen will be effectively removed from any future potential reaction.

The third potential source is the reactor itself, from outgassing and leaks. The reactor is basically constructed of graphite internal components, with an external metal atmospheric shell. The graphite itself is not likely to either capture or release oxides after the furnace is brought to temperature since they would readily react to form $CO/CO_2$, both gases that would pass through the reaction zone and out the exhaust. The possibility of leaks is limited by helium mass spectrometer leak detection under vacuum. All observed leaks, to the $10^{-9}$ std cc/sec limit of the leak detector, are corrected.

This leaves the HF used in the reaction as the most likely source of the water, and it is well recognized that commercially available HF contains water [William Braker and Allen L. Mossman, Matheson Gas Data Book, Fifth Edition, p. 305 (1971)]. Levels of water up to 300 ppm are "typical," basically limited by an azeotrope that occurs between the HF and $H_2O$ in the distillation process used to purify the material. Success in reducing the water content in HF to a level of about 60 ppm has been achieved by one of the manufacturer's of HF by repeated distillation over an extended period of time. No other procedure, such as a desiccant, has been demonstrated to be feasible, because of (1) the reactivity of HF, and (2) the similarity of the size of the two molecules. The possibility of an approach using a specially prepared resin claims to be possible for reducing the concentration of water vapor to 100 ppb has been suggested, but is unproven [Data Sheet on Epigrade Purifier for Hydrogen Fluoride, Advanced Technology Materials, Inc. (1987)].

SUMMARY OF THE INVENTION

In accordance with one aspect of the present invention, a new and improved method for dehydrating hydrogen fluoride the comprises the following steps:

Step 1 - A reactive metal halide is contacted with a hydrogen fluoride containing water to form a metal oxide, hydrogen halide, and anhydrous hydrogen fluoride.

Step 2 - The anhydrous hydrogen fluoride is separated from the metal oxide.

In accordance with another aspect of the present invention, a new and improved method for dehydrating hydrogen fluoride comprises the following steps:

Step 1 - A predetermined amount of liquid titanium tetrachloride is transferred to a container.

Step 2 - Liquid hydrogen fluoride containing water is transferred to the container containing the liquid titanium tetrachloride by heating the liquid hydrogen fluoride containing water to form a vapor of the liquid hydrogen fluoride containing water.

Step 3 - The vapor of the hydrogen fluoride containing water is condensed to form a liquid hydrogen fluoride containing water.

Step 3 - The liquid hydrogen fluoride containing water is thoroughly mixed with the liquid titanium tetrachloride in the container to react the water in the liquid hydrogen fluoride with the liquid titanium tetrachloride fluoride to form titanium oxide, hydrogen chloride, and liquid anhydrous hydrogen fluoride.

In accordance with another aspect of the present invention, a new and improved method for dehydrating hydrogen fluoride comprises the following steps:

Step 1 - A predetermined amount of solid hafnium tetrachloride is transferred to a container.

Step 2 - A vapor of hydrogen fluoride containing water is formed by heating a liquid hydrogen fluoride containing water at a temperature sufficient to form a vapor of hydrogen fluoride containing water.

Step 3 - The vapor of the hydrogen fluoride containing water is contacted with the solid hafnium tetrachloride to react with the water to form hafnium oxide, hydrogen chloride, and vapor anhydrous hydrogen fluoride.

Step 4 - The vapor anhydrous hydrogen fluoride is condensed to form a liquid anhydrous hydrogen fluoride.

DETAILED DESCRIPTION OF THE INVENTION

The new approach for removing the water from HF requires the addition of a third compound, such as $TiCl_4$, $HfCl_4$, and $ZrCl_4$, that will react only with the water, and yields products that are innocuous to the CVP process. The reaction shown in Equation 1 describes the proposed reaction.

$$HF + 2H_2O + TiCl_4 \rightarrow HF + TiO_2(s) + 4 HCl \quad (1)$$

In considering this method for eliminating the water from the HF, a thermochemical equilibrium program was used to evaluate the potential for controlling the water. Input conditions, such as 1.5 moles HF, 0.00015 moles $H_2O$, and 0.001 moles $TiCl_4$; P=1 atm. and 20° C. < T < 100° C., were chosen to cover the composition, pressure and temperature range anticipated. The resulting data, shown in Table 1, demonstrate the low equilibrium levels that are possible, with the partial pressure of the residual water to be less than $10^{-12}$ atmospheres.

TABLE 1

| Temperature (°C.) | Thermochemical Equilibrium Conditions | | | | | |
|---|---|---|---|---|---|---|
| | 24 | 25 | 27 | 35 | 50 | 100 |
| $H_2O$ | $2.3 \times 10^{-13}$ | $1.2 \times 10^{-13}$ | $1.2 \times 10^{-13}$ | $1.1 \times 10^{-13}$ | $1.3 \times 10^{-13}$ | $6.4 \times 10^{-13}$ |
| HCl | $4.3 \times 10^{-4}$ | $4.1 \times 10^{-4}$ | $3.8 \times 10^{-4}$ | $2.8 \times 10^{-4}$ | $2.2 \times 10^{-4}$ | $2.0 \times 10^{-4}$ |
| HF | $7.0 \times 10^{-1}$ | $7.1 \times 10^{-1}$ | $7.5 \times 10^{-1}$ | $8.5 \times 10^{-1}$ | $9.4 \times 10^{-1}$ | $9.8 \times 10^{-1}$ |
| $H_2F_2$ | $7.3 \times 10^{-2}$ | $7.4 \times 10^{-2}$ | $7.5 \times 10^{-2}$ | $7.3 \times 10^{-2}$ | $5.3 \times 10^{-2}$ | $1.4 \times 10^{-2}$ |
| $H_3F_3$ | $1.5 \times 10^{-2}$ | $1.5 \times 10^{-2}$ | $1.5 \times 10^{-2}$ | $1.2 \times 10^{-2}$ | $5.0 \times 10^{-3}$ | $2.6 \times 10^{-4}$ |
| $H_4F_4$ | $6.2 \times 10^{-3}$ | $6.0 \times 10^{-3}$ | $5.6 \times 10^{-3}$ | $3.6 \times 10^{-3}$ | $9.4 \times 10^{-4}$ | $1.1 \times 10^{-5}$ |
| $H_5F_5$ | $3.3 \times 10^{-3}$ | $3.2 \times 10^{-3}$ | $2.8 \times 10^{-3}$ | $1.4 \times 10^{-3}$ | $2.3 \times 10^{-4}$ | $5.2 \times 10^{-7}$ |
| $H_6F_6$ | $2.0 \times 10^{-1}$ | $1.8 \times 10^{-1}$ | $1.5 \times 10^{-1}$ | $5.6 \times 10^{-2}$ | $4.3 \times 10^{-3}$ | $1.1 \times 10^{-6}$ |
| $H_7F_7$ | $9.7 \times 10^{-4}$ | $8.8 \times 10^{-4}$ | $7.1 \times 10^{-4}$ | $2.4 \times 10^{-4}$ | $1.3 \times 10^{-5}$ | $1.1 \times 10^{-9}$ |
| $TiCl_4$ | $1.3 \times 10^{-3}$ | $1.3 \times 10^{-3}$ | $1.2 \times 10^{-3}$ | $8.6 \times 10^{-4}$ | $6.7 \times 10^{-4}$ | $6.3 \times 10^{-4}$ |
| $TiO_2$(s) | $1.1 \times 10^{-4}$ | $1.0 \times 10^{-4}$ | $9.5 \times 10^{-5}$ | $7.0 \times 10^{-5}$ | $5.4 \times 10^{-5}$ | $5.1 \times 10^{-5}$ |

The above values represent the equilibrium mole fractions of the components at one atmosphere.

A question concerning the potential presence of titanium in the resulting $ZrF_4$ naturally arises since it will be necessary to add excess $TiCl_4$ to assure complete reaction. The vapor pressure of $TiCl_4$ is less than that of HF, but a portion will be carried over as approximately calculated. Under the operating conditions used in the CVP process, it is likely some or all of the titanium would be incorporated in the $ZrF_4$ as $TiF_4$, as well as any residual $TiCl_4$. Fortunately experimental data indicate that such incorporation will not affect the glasses typically prepared from the material as indicated in the reference Y. Ohishi, S. Mitachi, T. Kanamori and T. Manabe, "Optical absorption of 3d transition metal and rare earth elements in zirconium fluoride glasses," Physics and Chemistry of Glasses 25(5), 135–140 (1983). This reference found no measurable effect in either the infrared or visible when the glass was doped at a level many orders of magnitude above the potential contamination level.

One approach for preparation of the dehydrated HF requires the use of a receiver container to avoid contaminating a commercial cylinder of HF. Prior to the HF transfer the desired amount of $TiCl_4$, about a 10 mole percent excess than the stoichiometic amount required to react with the water contained in the HF, is placed in a third container connected to the evacuated receiver that will hold the HF. The receiver container is made from halogen resistant material such as fluorocarbon coated stainless steel. The $TiCl_4$ is transferred first, followed by the HF as a vapor by heating the container containing the HF to about 30° C. After the transfers, the container is shaken to mix the chemicals and resulting dehydrated HF within the container is then ready for use in the CVP process.

As another example hafnium tetrachloride can be used instead of titanium tetrachloride by transferring a predetermined amount of solid hafnium tetrachloride to a second container, about a 10 mole percent excess than the stoichiometric amount required to react with the water to be removed from the HF. Then liquid hydrogen fluoride containing water is heated at a temperature sufficient to form a vapor of hydrogen fluoride containing water and is then contacted with the solid hafnium tetrachloride to react with the water to form hafnium oxide, hydrogen chloride, and vapor anhydrous hydrogen fluoride. The vapor anhydrous hydrogen fluoride is then condensed into the receiver to form a liquid anhydrous hydrogen fluoride.

This new and novel method provides a water free HF source for the CVP process in the preparation of pure $ZrF_4$.

While there has been shown and described what is at present considered the preferred embodiment of the invention, it will be obvious to those skilled in the art that various changes and modifications may be made therein without departing from the scope of the invention as defined by the appended claims.

What is claimed is:

1. A method for dehydrating hydrogen fluoride containing water comprising the following steps:
   Step 1 - contacting a metal halide with a hydrogen fluoride containing water, reacting said metal halide with said water to form a metal oxide, hydrogen halide, and anhydrous hydrogen fluoride; and
   Step 2 - separating said anhydrous hydrogen fluoride and said hydrogen halide from said metal oxide, wherein said metal halide is selected from the group consisting of $TiCl_4$, $HfCl_4$, $ZrCl_4$, and combinations thereof.

2. A method of dehydrating liquid hydrogen fluoride containing water comprising the steps:
   Step 1 - transferring an amount of liquid titanium tetrachloride to a container, said amount being sufficient to react with said water contained in said liquid hydrogen fluoride;
   Step 2 - transferring said liquid hydrogen fluoride containing water from a second container to said container containing said liquid titanium tetrachloride by heating said liquid hydrogen fluoride containing water in said second container to form a vapor of said liquid hydrogen fluoride containing water;
   Step 3 - condensing said vapor of said hydrogen fluoride containing water in said container to form a liquid hydrogen fluoride containing water; and
   Step 4 - thoroughly mixing said liquid hydrogen fluoride containing water with said liquid titanium tetrachloride in said container to react said water in said liquid hydrogen fluoride with said liquid titanium tetrachloride to form titanium oxide, hydrogen chloride, and anhydrous liquid hydrogen fluoride.

3. A method in accordance with claim 2 wherein said amount of liquid titanium tetrachloride comprises about a 10 mole percent excess than the stoichiometric amount required to react with said water contained in said liquid hydrogen fluoride containing water.

4. A method for dehydrating liquid hydrogen fluoride containing water comprising the following steps:

Step 1 - transferring an amount of solid hafnium tetrachloride to a container, said amount being sufficient to react with said water contained in said liquid hydrogen fluoride;

Step 2 - heating said liquid hydrogen fluoride containing water contained in a second container at a temperature sufficient to form a vapor of hydrogen fluoride containing water;

Step 3 - transferring said vapor of said hydrogen fluoride containing water to said container containing said solid hafnium tetrachloride and contacting said vapor of said hydrogen fluoride containing water with said solid hafnium tetrachloride to react with said water to form hafnium oxide, hydrogen chloride, and vapor anhydrous hydrogen fluoride; and Step 4 - condensing said vapor of anhydrous hydrogen fluoride into a receiver to form a liquid anhydrous hydrogen fluoride and hydrogen chloride.

5. A method in accordance with claim 4 wherein said amount of solid hafnium tetrachloride comprises about a 10 mole percent excess of the stoichiometric amount required to react with said water.

* * * * *